(12) United States Patent
Merrell et al.

(10) Patent No.: US 12,091,873 B2
(45) Date of Patent: Sep. 17, 2024

(54) SERVICE POLE ASSEMBLIES AND FITTINGS FOR FLOOR MOUNTED SERVICE POLE INTEGRATION

(71) Applicant: Hubbell Incorporated, Shelton, CT (US)

(72) Inventors: Richard James Merrell, New Haven, CT (US); Emircan Matthew Dumani, Shelton, CT (US)

(73) Assignee: Hubbell Incorporated, Shelton, CT (US)

( * ) Notice: Subject to any disclaimer, the term of this patent is extended or adjusted under 35 U.S.C. 154(b) by 174 days.

(21) Appl. No.: 17/843,679

(22) Filed: Jun. 17, 2022

(65) Prior Publication Data

US 2022/0325551 A1 Oct. 13, 2022

Related U.S. Application Data

(63) Continuation of application No. PCT/US2020/065662, filed on Dec. 17, 2020.

(60) Provisional application No. 62/949,081, filed on Dec. 17, 2019.

(51) Int. Cl.
*E04H 12/22* (2006.01)
*H02G 3/04* (2006.01)

(52) U.S. Cl.
CPC ........... *E04H 12/22* (2013.01); *H02G 3/0493* (2013.01)

(58) Field of Classification Search
CPC .......... H02G 3/06; H02G 3/081; H02G 3/185; H02G 3/22; H02G 3/283; H02G 3/383; H02G 3/0462; H02G 3/0493; E04H 12/22; B60L 53/31
See application file for complete search history.

(56) References Cited

U.S. PATENT DOCUMENTS

| 6,797,885 B2 | 9/2004 | Magyar et al. |
| 2013/0309022 A1 | 11/2013 | Hokfelt |
| 2017/0104321 A1 | 4/2017 | Carbone et al. |

FOREIGN PATENT DOCUMENTS

DE 102009026515 A1 12/2010

*Primary Examiner* — Mark R Wendell
(74) *Attorney, Agent, or Firm* — Ruggiero McAllister & McMahon LLC

(57) ABSTRACT

A service pole fitting is provided. The fitting includes a top and a base. The top has a cover with an opening. The opening is configured to removably secure a service pole in the top. The base is secured to the cover to define an inner space. The base is configured to be removably secured to a floor mounted source.

18 Claims, 12 Drawing Sheets

SERVICE POLE ASSEMBLIES AND FITTINGS FOR FLOOR MOUNTED SERVICE POLE INTEGRATION

CROSS REFERENCE TO RELATED APPLICATIONS

This application is a continuation of International Application PCT/US20/65662 filed Dec. 17, 2020, which claims the benefit of U.S. Application 62/949,081 filed Dec. 17, 2019, the entire contents of both of which are incorporated herein by reference.

BACKGROUND

1. Field of the Invention

The present disclosure is related to service pole assemblies and service pole fittings. More particularly, the present disclosure is related to service poles and fittings for floor mounted integration.

2. Description of Related Art

In many indoor commercial and industrial settings, service poles are commonly used to distribute power and/or communication wiring from above (e.g., ceiling mounted or raised raceways) to a workstation. The workstation can be an office cubical, a point of sale register, an industrial machine, and others locations.

The service poles are integrated with an overhead power/communication source ("source") to feed the power and/or communication signals ("signals") to the workstation. As used herein, the term "integrated with" shall mean mechanically secured in a manner that also provides an enclosure for connection of electrical and/or communication wiring. Thus, the service poles serve as a conduit for the wiring carrying signals between the source and the workstation.

The service poles can have an internal divider that physically separates and/or isolates the power and communication wiring from one another. The service poles can also be configured to pass through a ceiling that is used to conceal the source.

Unfortunately, some indoor commercial and industrial settings lack overhead sources, but instead make use of floor mounted sources (e.g., raceways) that provide sources along the floor.

Moreover, it has been determined by the present disclosure that some indoor commercial and industrial settings have overhead sources, but have a need to make use the floor mounted raceways to distribute power coming from the overhead source so as to limit the number of drops from the overhead source.

Accordingly, it has been determined by the present disclosure that there is a need for service pole assemblies and fittings for such service pole assemblies that are configured for integration with floor mounted sources and/or raceways.

SUMMARY

Service pole assemblies and service pole fittings for integration of service poles with floor mounted sources such as raceways that will allow for the power/communication signals to be brought into a workstation from the floor. In some embodiments, the service pole assemblies and service pole fittings for such assemblies include a divider system that allow isolation of power and communication signals.

Service pole fittings are provided that are configured to allow the same pole that is used for ceiling integration to also be usable for floor integration.

A service pole fitting is provided. The fitting includes a top and a base. The top has a cover with an opening. The opening is configured to removably secure a service pole in the top. The base is secured to the cover to define an inner space. The base is configured to be removably secured to a floor mounted source.

In some embodiments either alone or together with any one or more of the aforementioned and/or after-mentioned embodiments, the top further includes a pole foot at the opening in the cover. The pole foot is sized and configured to receive the service pole.

In some embodiments either alone or together with any one or more of the aforementioned and/or after-mentioned embodiments, the pole foot further includes one or more fasteners configured to releasably secure the service pole.

In some embodiments either alone or together with any one or more of the aforementioned and/or after-mentioned embodiments, the pole foot has a cross section selected from a group consisting of square, rectangular, round, and ovoid.

In some embodiments either alone or together with any one or more of the aforementioned and/or after-mentioned embodiments, the top further includes one or more structural braces depending from the cover. The structural braces securing the cover to the base.

In some embodiments either alone or together with any one or more of the aforementioned and/or after-mentioned embodiments, the base further includes a wall that divides the inner space into two regions that are physically isolated from one other.

In some embodiments either alone or together with any one or more of the aforementioned and/or after-mentioned embodiments, the two regions are open at an upper end of the base. One of the two regions having a pair of spaced apart openings at a lower end of the base and the other of the two regions has a central opening at the lower end of the base.

In some embodiments either alone or together with any one or more of the aforementioned and/or after-mentioned embodiments, the wall is positioned in the inner space so as to act as a stop for a pole.

In some embodiments either alone or together with any one or more of the aforementioned and/or after-mentioned embodiments, the wall has a step that provides for a pathway for wiring from a floor mounted source through the cover.

In some embodiments either alone or together with any one or more of the aforementioned and/or after-mentioned embodiments, the wall has a notch aligned with an opening in the cover.

In some embodiments either alone or together with any one or more of the aforementioned and/or after-mentioned embodiments, the base further incudes one or more structural braces that are configured to mate with corresponding slots in the floor mounted source.

In some embodiments either alone or together with any one or more of the aforementioned and/or after-mentioned embodiments, the base further includes one or more fastener openings through which fasteners can extend to secure the base to the floor mounted source.

A service pole assembly is also provided. The assembly includes a service pole, a floor mounted source, and a fitting configured to integrate the service pole to the floor mounted source.

In some embodiments either alone or together with any one or more of the aforementioned and/or after-mentioned embodiments, the fitting has a top and a base. The top includes a pole foot sized and configured to receive the service pole.

In some embodiments either alone or together with any one or more of the aforementioned and/or after-mentioned embodiments, the floor mounted source is a raceway.

In some embodiments either alone or together with any one or more of the aforementioned and/or after-mentioned embodiments, the service pole has a cross section selected from a group consisting of square, rectangular, round, and ovoid.

In some embodiments either alone or together with any one or more of the aforementioned and/or after-mentioned embodiments, the service pole further includes an isolation barrier dividing the service pole into two conduits that are physically isolated from one other.

In some embodiments either alone or together with any one or more of the aforementioned and/or after-mentioned embodiments, the fitting includes a top and a base. The base having a wall that divides the base into two regions that are physically isolated from one other.

In some embodiments either alone or together with any one or more of the aforementioned and/or after-mentioned embodiments, the barrier and the wall are parallel to each other.

In some embodiments either alone or together with any one or more of the aforementioned and/or after-mentioned embodiments, the barrier and the wall are coplanar to each other.

The above-described and other features and advantages of the present disclosure will be appreciated and understood by those skilled in the art from the following detailed description, drawings, and appended claims.

DETAILED DESCRIPTION

Figure 1:
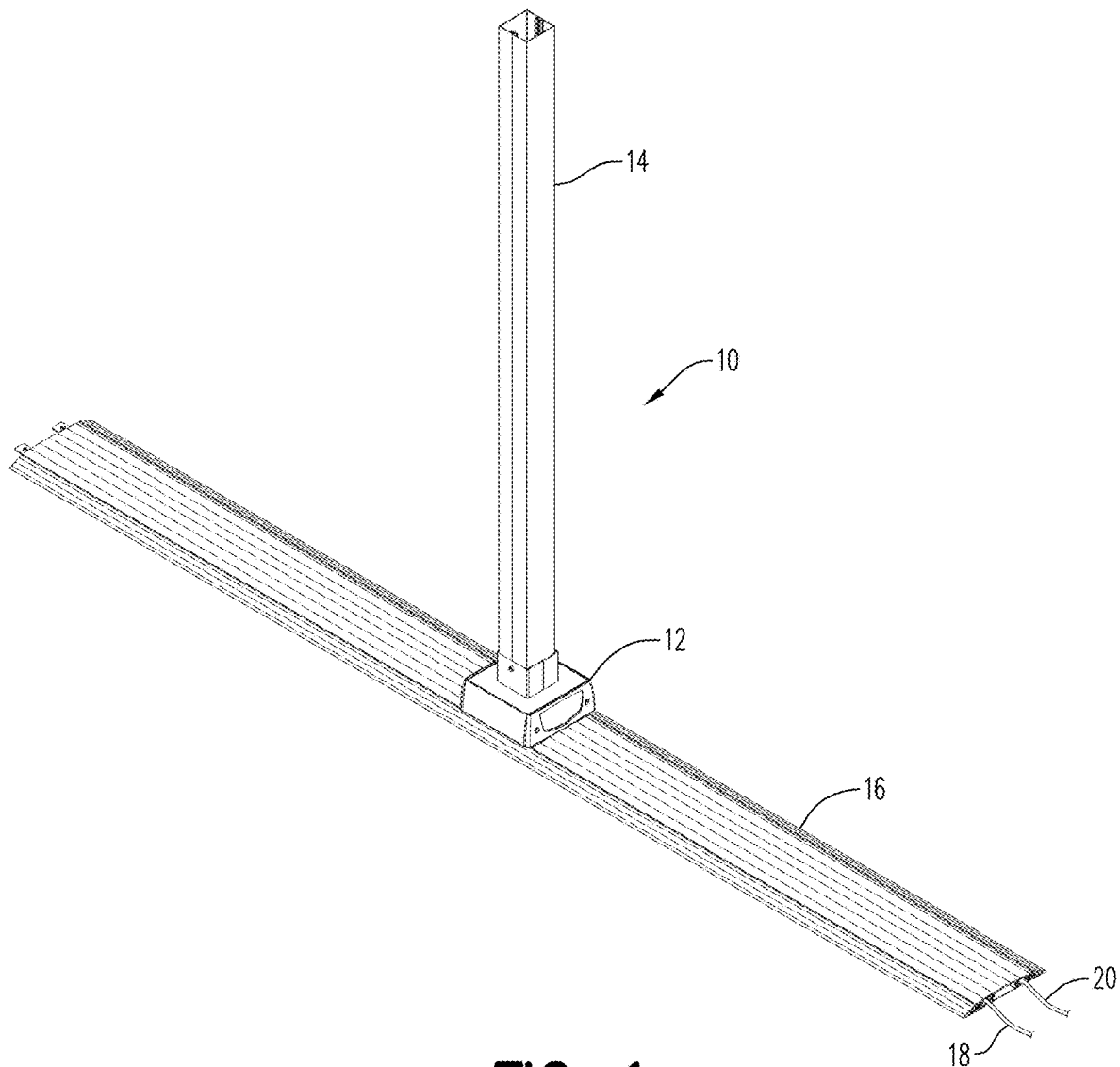
FIG. 1 is a perspective view of an exemplary embodiment of a service pole assembly and fitting according to the present disclosure.
Figure 2:
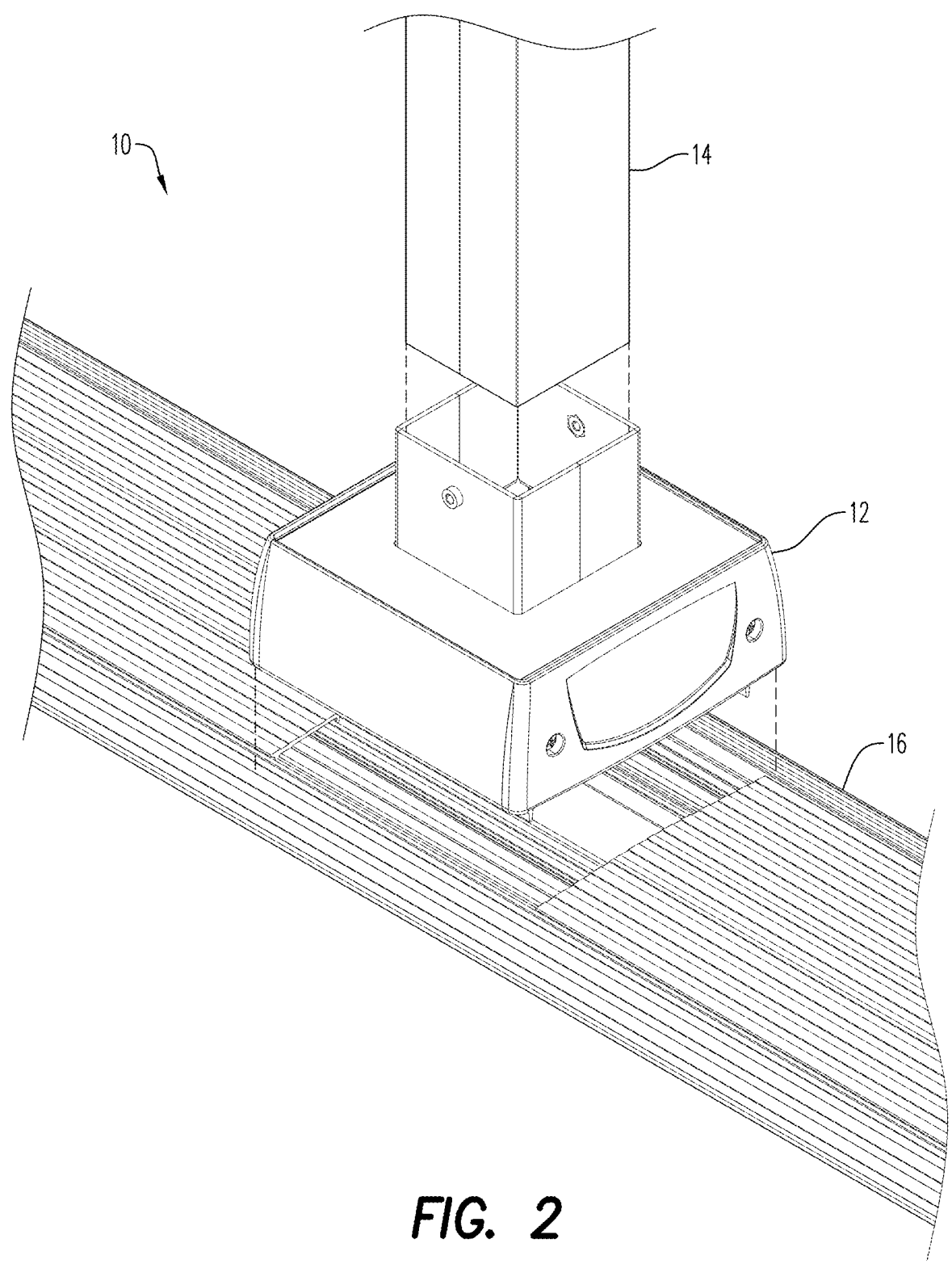
FIG. 2 is an enlarged partially exploded view of the assembly of FIG. 1.

Referring to the drawings and in particular to FIGS. 1 and 2, an exemplary embodiment of a service pole assembly according to the present disclosure is shown and is generally referred to by reference numeral 10.

Advantageously, assembly 10 includes a fitting 12 configured to integrate a service pole 14 and a floor mounted source 16 housing wiring for power 18 and/or communication 20.

For ease of discussion, pole 14 is commercially available from the Applicant, Hubbell Incorporated. Also for ease of discussion, source 16 is shown as a floor mounted raceway commercially available from FSR Inc. under the tradename Smart-Way Raceway System. Of course, it is contemplated by the present disclosure for fitting 12 to find use with other poles 14 and/or other floor mounted sources 16.

Thus, fitting 12 can be configured for use with commercially available service poles 14, which are commonly used in ceiling integration applications. In addition, fitting 12 can be configured for integration to commercially available floor mounted sources 16. In this manner, fitting 12 can find use with commercially available components so that assembly 10 is available as needed.

It should be recognized that assembly 10 is disclosed by way of example having fitting 12 configured for use with pole 14 with a square cross section. Of course, it is also contemplated by the present disclosure for fitting 12 to be configured for integration of pole 14 of any cross section such as, but not limited to, rectangular, round, ovoid, and others.

Figure 3A:
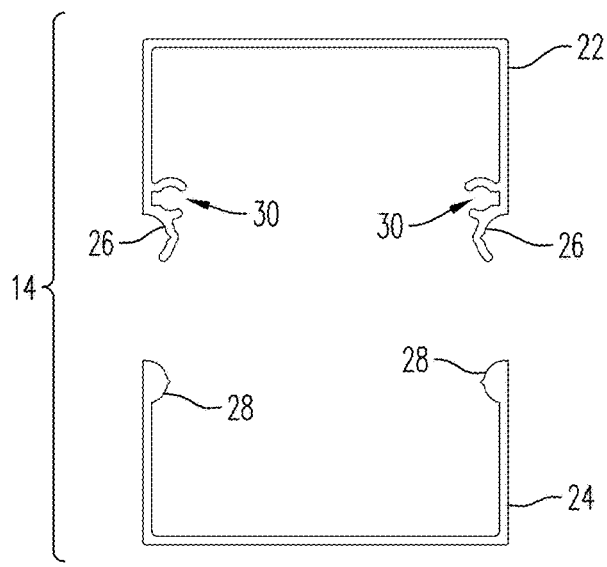
FIG. 3A is an end view of the service pole of FIG. 1 in a disassembled state.
Figure 3B:
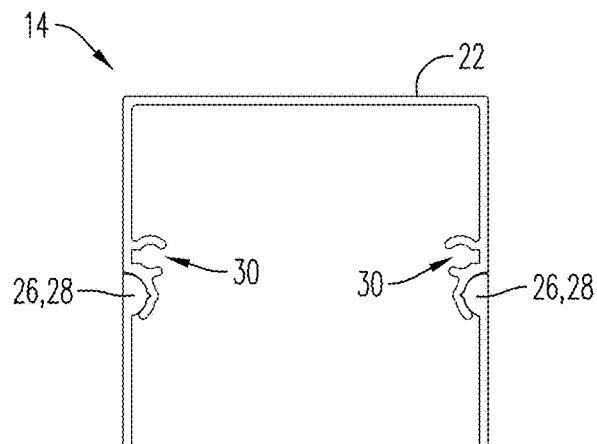
FIG. 3B is an end view of the service pole of FIG. 1 in an assembled state.
Figure 3C:
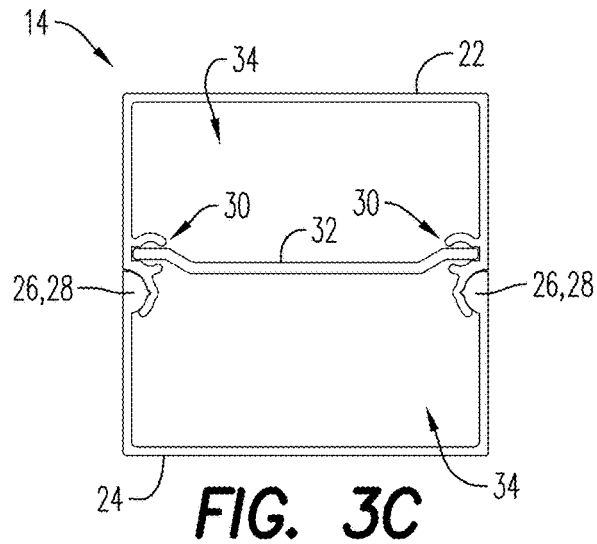
FIG. 3C is an end view of the service pole of FIG. 1 having an isolation barrier installed.
Figure 4:
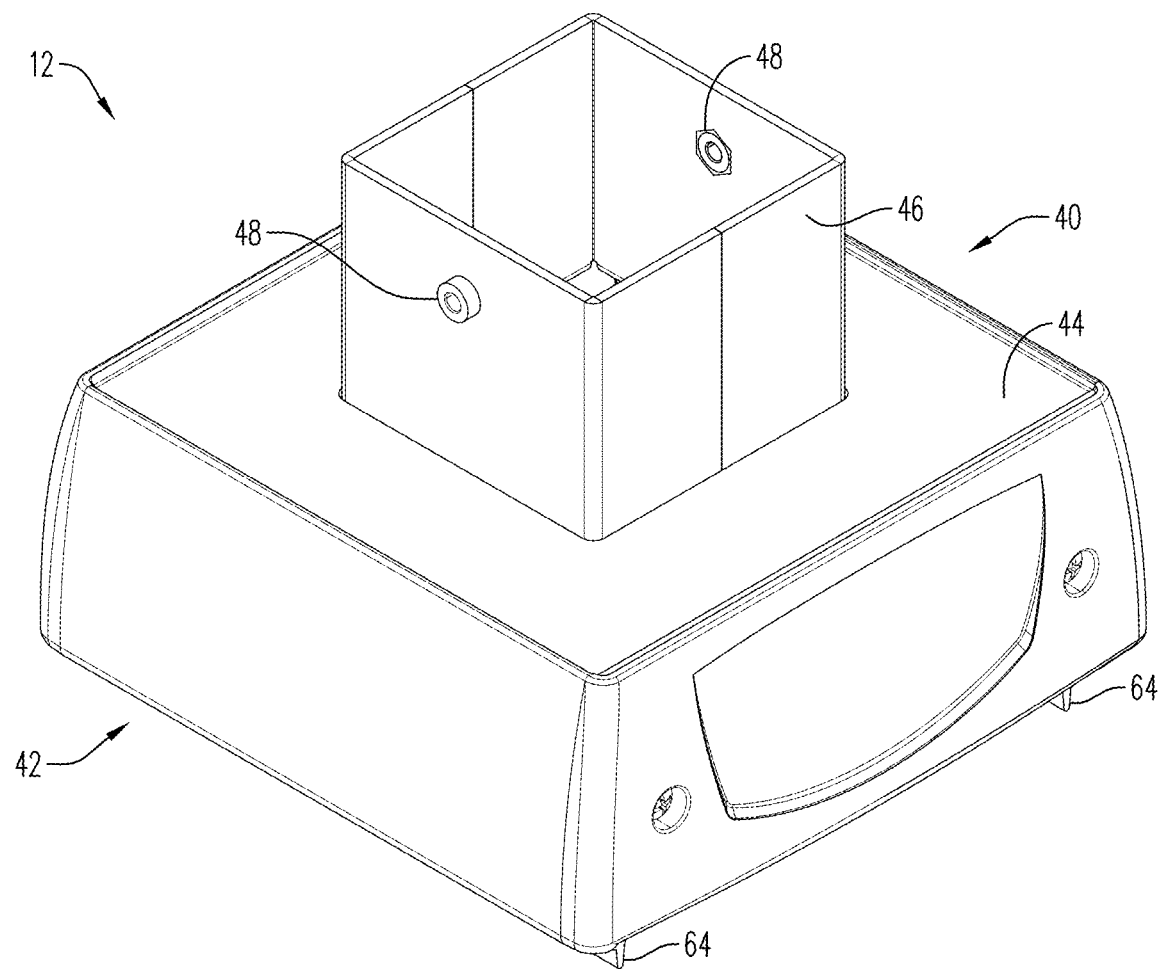
FIG. 4 is a top perspective view of the service pole fitting of FIG. 1.
Figure 5:
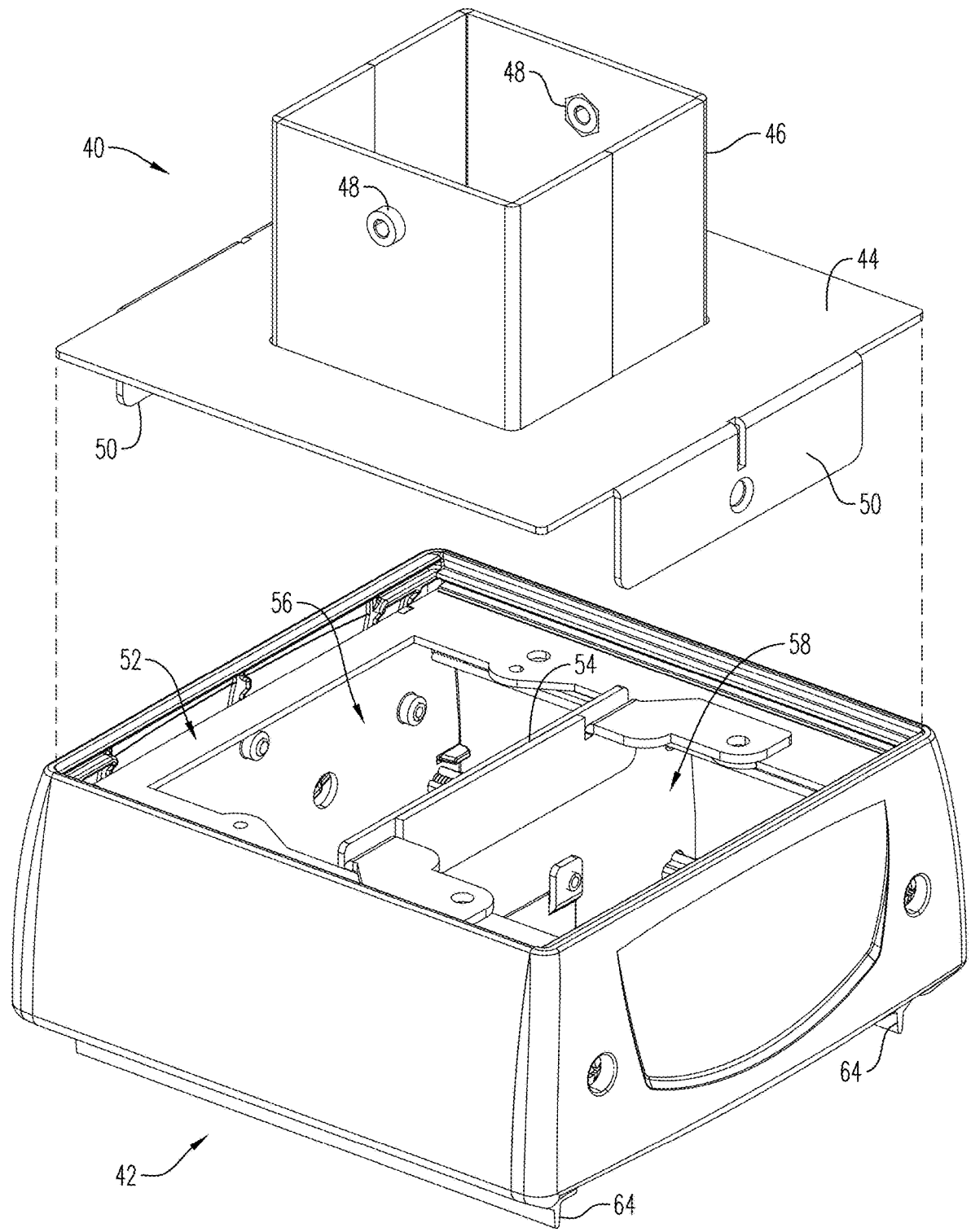
FIG. 5 is a partially exploded view of the service pole fitting of FIG. 4.
Figure 6:
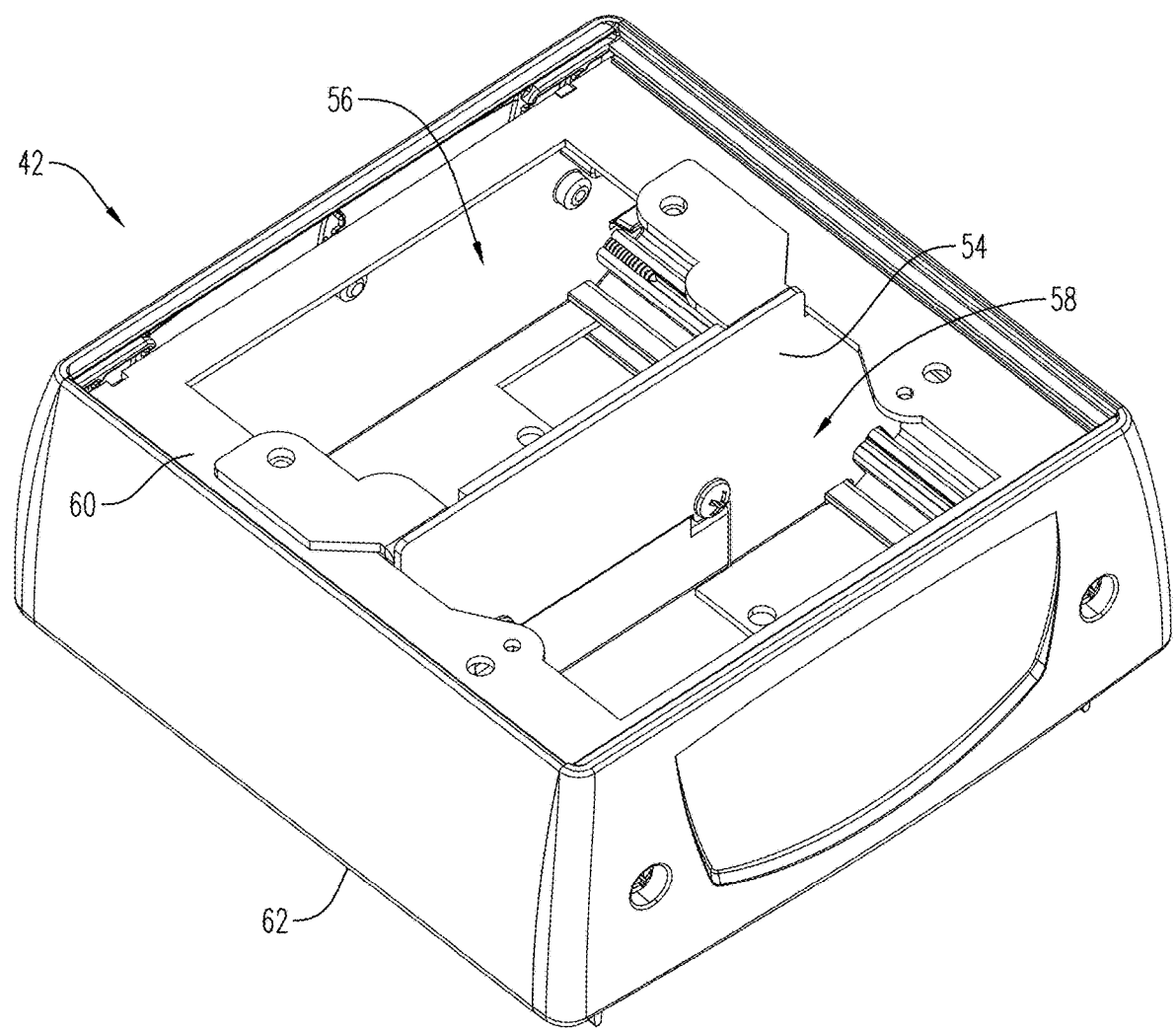
FIG. 6 is a top perspective view of a base of the service pole fitting of FIG. 4.
Figure 7:
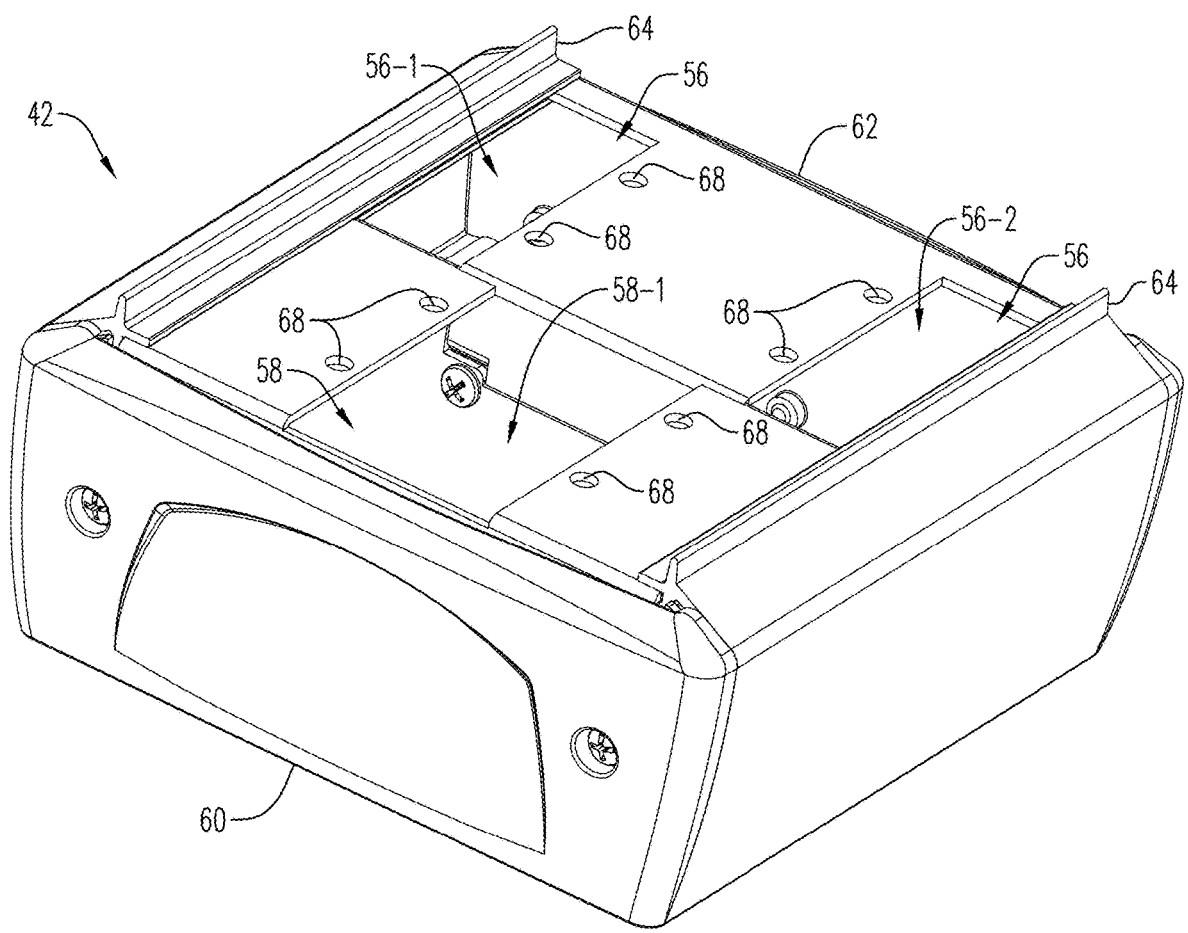
FIG. 7 is a bottom view of the base of FIG. 4.
Figure 8:
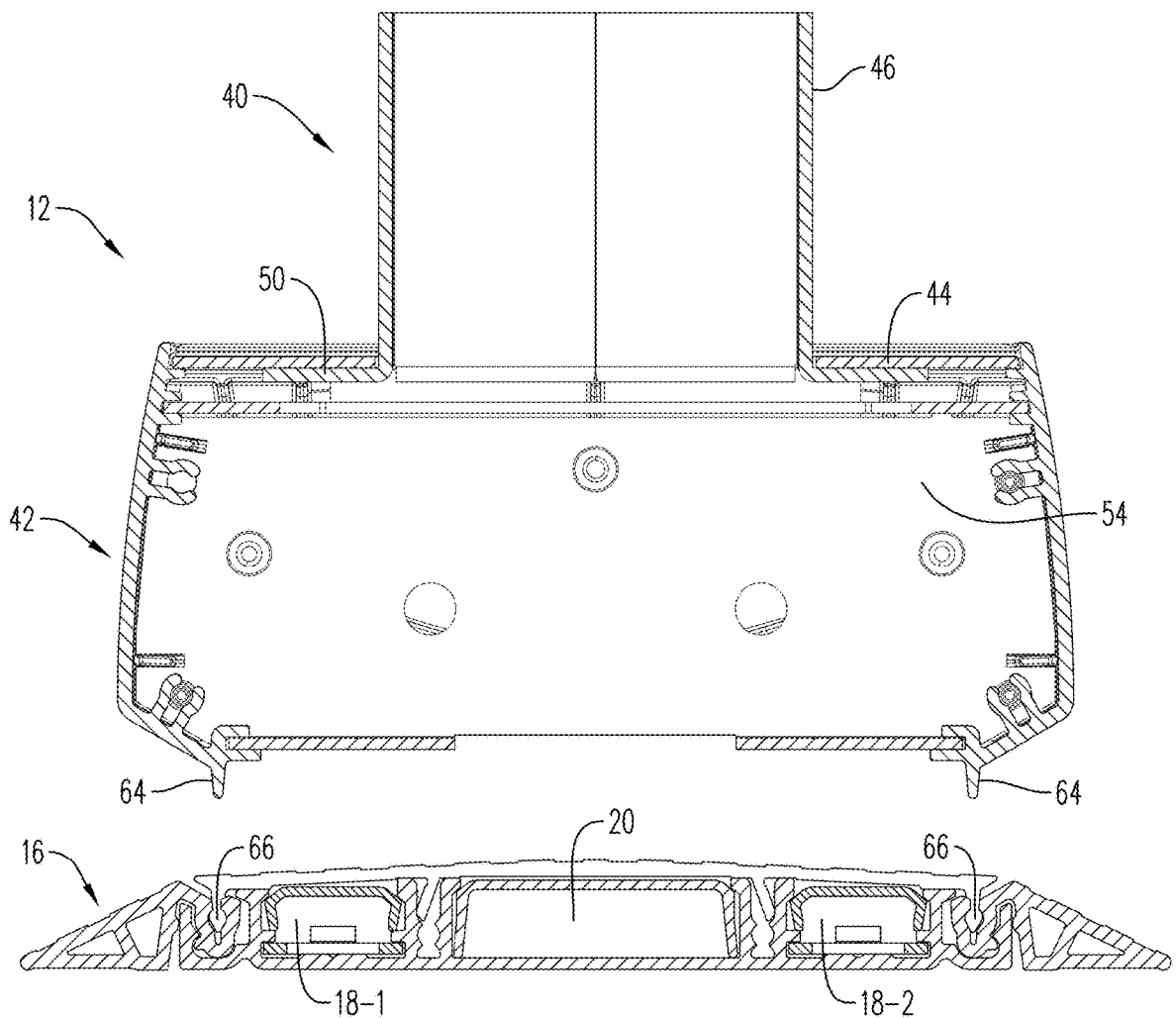
FIG. 8 is a sectional view of the base of FIG. 4 unsecured from a floor mounted source.
Figure 9:
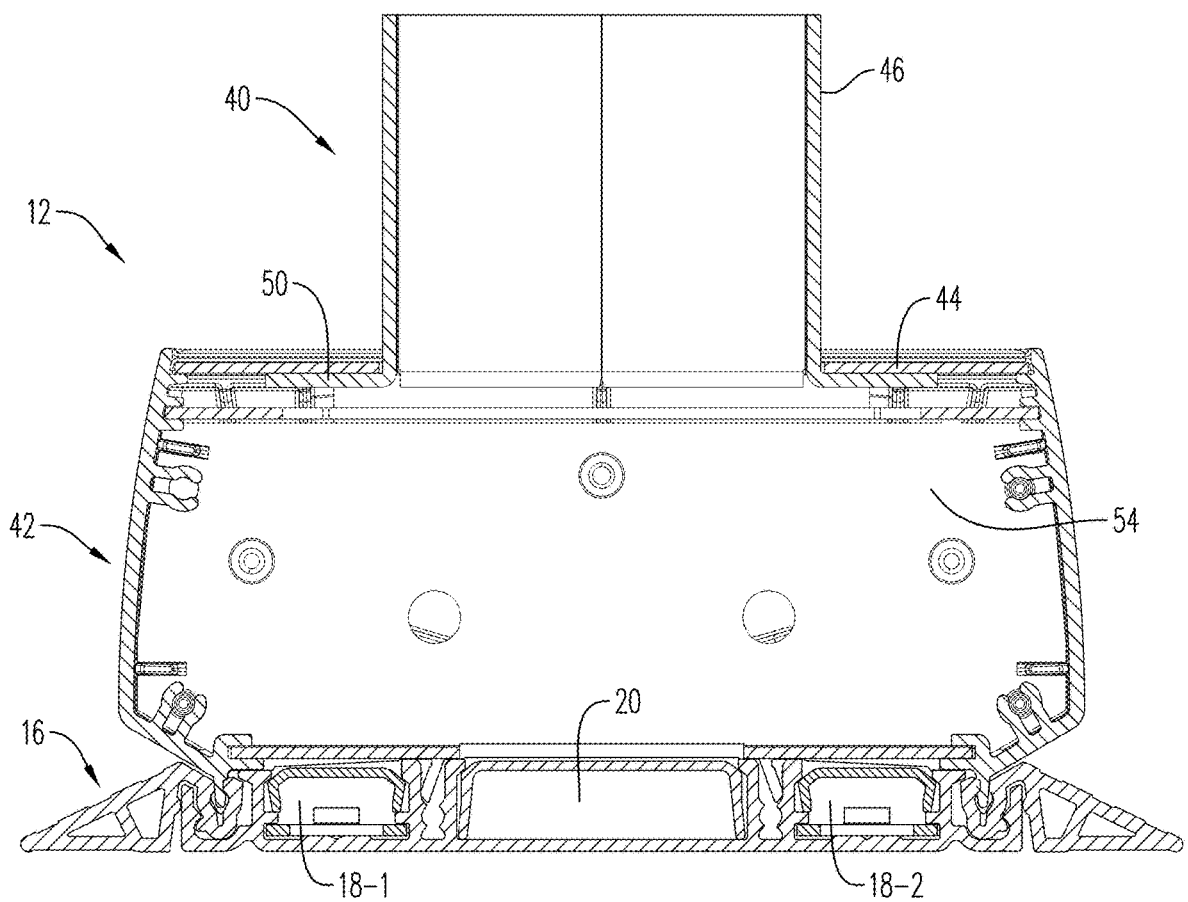
FIG. 9 is a sectional view of the base of FIG. 4 secured to a floor mounted source.

Turning now to FIGS. 3A-3C, service pole 14 is shown in more detail. Here, pole 14 has a first section 22 and a second section 24 that have complementary fasteners 26, 28 that secure the sections to one another to form the pole. In addition, one or both of the sections can include another region 30 configured to receive an isolation barrier 32. In the illustrated embodiment, first section 22 includes two regions 30.

Pole 14, when barrier 32 is installed, provides two conduits 34, 36 that are physically isolated from one other—and in some embodiments—isolated from electrical interference from one another. In this manner, wiring can feed communication signals through conduit 34 and can feed electrical power through conduit 36 without cross-talk or interference.

Of course, other constructions of pole 14 are contemplated by the present disclosure so that the pole provides a conduit that can be integrated, via fitting 12, to source 16. For example, pole 14 can be formed as a single unitary part with or without a barrier.

Fitting 12 will be described in more detail with simultaneous reference to FIGS. 4-9.

Fitting 12 includes a top 40 and a base 42. Top 40 includes a cover 44 that can secure the top to base 42 can cover or enclose an inner region of the base.

Top 40 can, in some embodiments, include a pole foot 46 that is sized and configured to receive pole 14. Thus, pole foot 46 can have a square cross section in embodiments where pole 14 has a square cross section. Pole foot 46 can have one or more fasteners 48 (two shown) that can releasably secure pole 14 to top 40.

Top 40 can further include, in some embodiments, one or more structural braces 50 (two shown) depending from cover 44. Braces 50 can secure cover 44 to base 42 to ensure the structural integrity of fitting 12 when integrated with pole 14 and source 16.

Base 42 defines an inner space 52—and preferably includes a wall 54 that divides the space 52 into two or more regions 56, 58 (two shown). Regions 56, 58 are physically isolated from one other—and in some embodiments—isolated from electrical interference from one another.

Regions 56, 58 are both open at an upper end 60 of base 42. In embodiments where pole 14 includes barrier 32 dividing the pole into conduits 34, 36, the pole is secured to fitting 12 so that conduit 34 is aligned with region 56 and conduit 36 is aligned with region 58. Stated differently, pole 14 is inserted into fitting 12 so that barrier 32 and wall 54 are parallel—and preferably co-planar to—one another.

Regions 56, 58 are also both open at a lower end 62 of base 42. Here, region 56 has a pair of spaced apart openings 56-1, 56-2, while region 58 has a central opening 58-1. Source 16 is shown having the neutral 18-1 and common 18-2 wiring for power 18 and a single communication wiring 20.

Base 42, when connected to source 16, aligns opening 56-1 with neutral 18-1 and algins opening 56-2 with common 18-2 to feed power into region 56. Additionally, base 42, when connected to source 16, aligns opening 58 with communication wiring 20 to feed communication signals into region 58.

In this manner, wiring can feed power signals from source 16 through region 56 of base 42 into conduit 34 and wiring can feed communication signals from source 16 through region 58 of base 42 into conduit 36 without cross-talk or interference.

Base 42 can, in some embodiments, include a stop that prevents pole 14 from passing through top 40 into space 52. In the illustrated embodiment, wall 54 is positioned in space 52 so as to act as the stop. Of course, it should be recognized that it is contemplated by the present disclosure for base 42 and/or top 40 to include a stop separate from wall 54.

Base 42 is removably securable to source 16. Base 42 can include one or more structural braces 64 (two shown) that are configured to mate with corresponding slots 66 in source 16. Additionally or alternatively, base 42 can includes one or more fastener openings 68 (FIG. 7) through which fasteners can extend to secure base to source 16.

Accordingly, it has been determined by the present disclosure that fitting 12 can find use with poles 14 and floor mounted sources 16 to provide an alternative method of providing power and/or communication signals to workspaces via assembly 10. Moreover, fitting 12 can be configured for use with commercially available poles 14 and/or sources 16.

Still further, fitting 12 can be configured due to wall 54 and regions 56, 58—when in use with poles 14 that have barrier 32 forming separate conduits 34, 36—to feed power and communication signals in physically isolated regions so as to avoid or mitigate cross-talk or interference between the signals.

Figure 10:
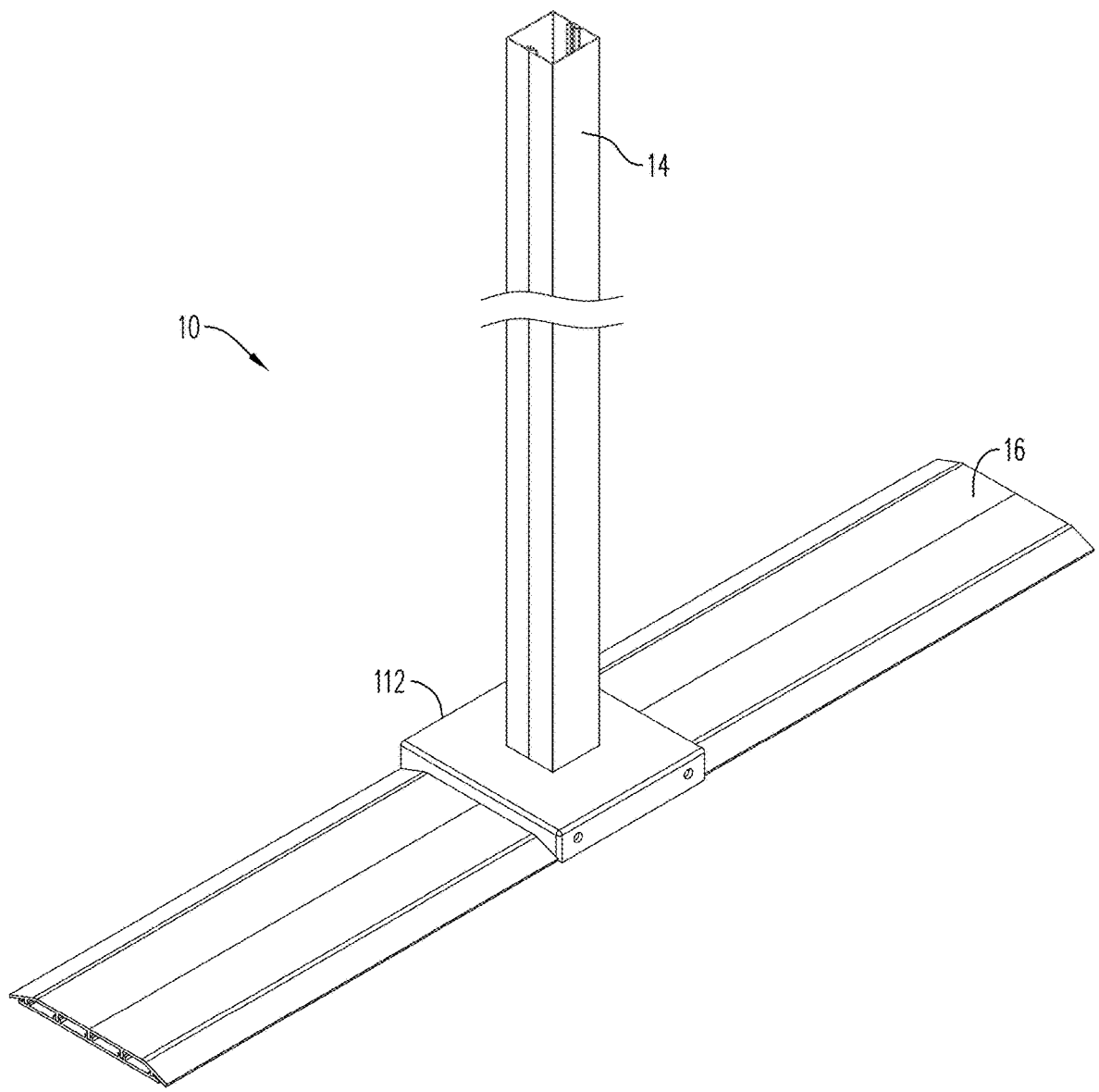
FIG. 10 is a perspective view of another exemplary embodiment of a service pole assembly according to the present disclosure.
Figure 11:
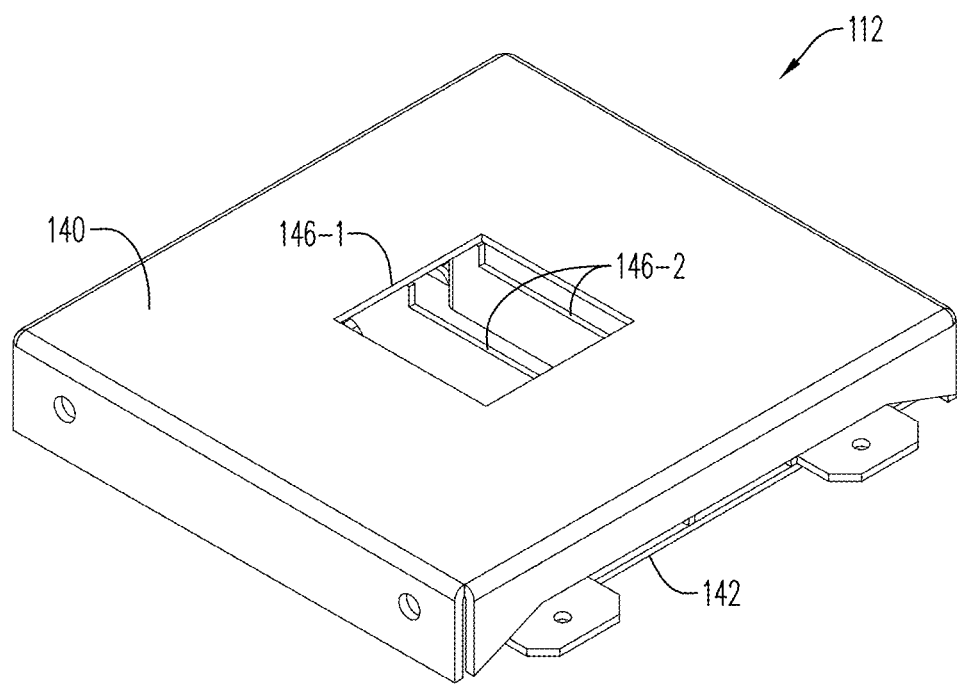
FIG. 11 is a top perspective view of a service pole fitting of FIG. 10.
Figure 12:
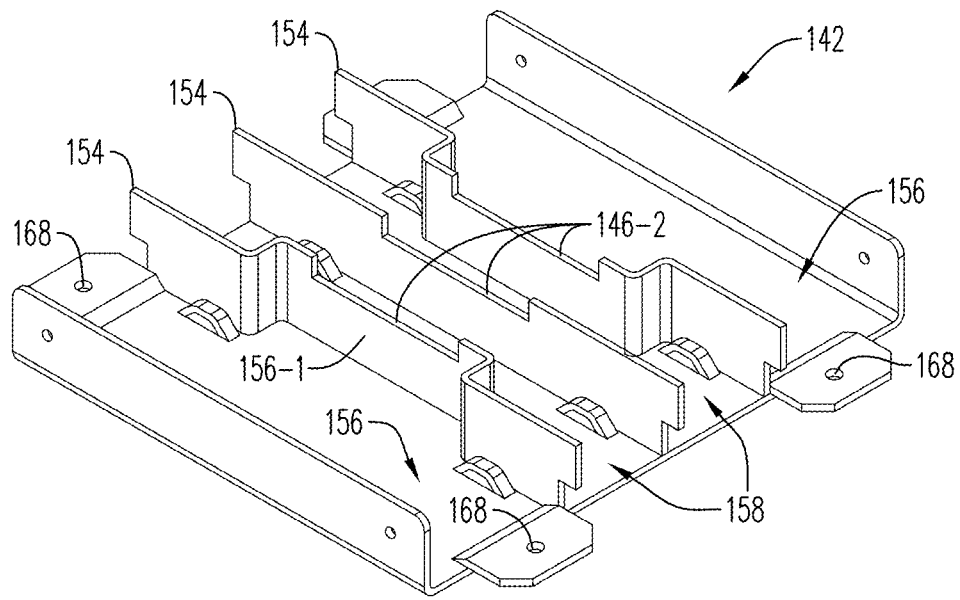
FIG. 12 is a top perspective view of a base of the service pole fitting of FIG. 11.

Referring now to FIGS. 10-12, an alternate embodiment of a fitting according to the present disclosure is shown and is referred to be reference numeral 112 with component parts performing similar or analogous functions also be labeled in multiples of one hundred.

Similar to the embodiment discussed above, fitting 112 is shown in use with pole 14 and source 16 forming assembly 10.

Fitting 112 includes a top 140 and a base 142. Top 140 includes an opening 146-1 into which pole 14 can be inserted into fitting 112. Base 142 includes one or more walls 154 that divide the base into regions 156, 158. Regions 156, 158 are physically isolated from one other—and in some embodiments—isolated from electrical interference from one another. One or more of walls 154 at region 156 can have a step 156-1 that provides for a pathway for wiring from source 16 through fitting 112 into pole 14.

Additionally, walls 154 can include a notch 146-2 aligned with opening 146-1. In this manner, top 140 and base 142 combine, via opening 146-1 and notch 146-2 to provide a location that received the bottom of pole 14.

Base 142 can include one or more fastener openings 168 through which fasteners can extend to secure base to source 16 or directly to the floor.

Accordingly, it has been determined by the present disclosure that fitting 112 can find use with poles 14 and floor mounted sources 16 to provide an alternative method of providing power and/or communication signals to workspaces via assembly 10. Moreover, fitting 112 can be configured for use with commercially available poles 14 and/or sources 16.

Still further, fitting 112 can be configured due to walls 154 and regions 156, 158—when in use with poles 14 that have barrier 32 forming separate conduits 34, 36—to feed power and communication signals in physically isolated regions so as to avoid or mitigate cross-talk or interference between the signals.

Figure 13:
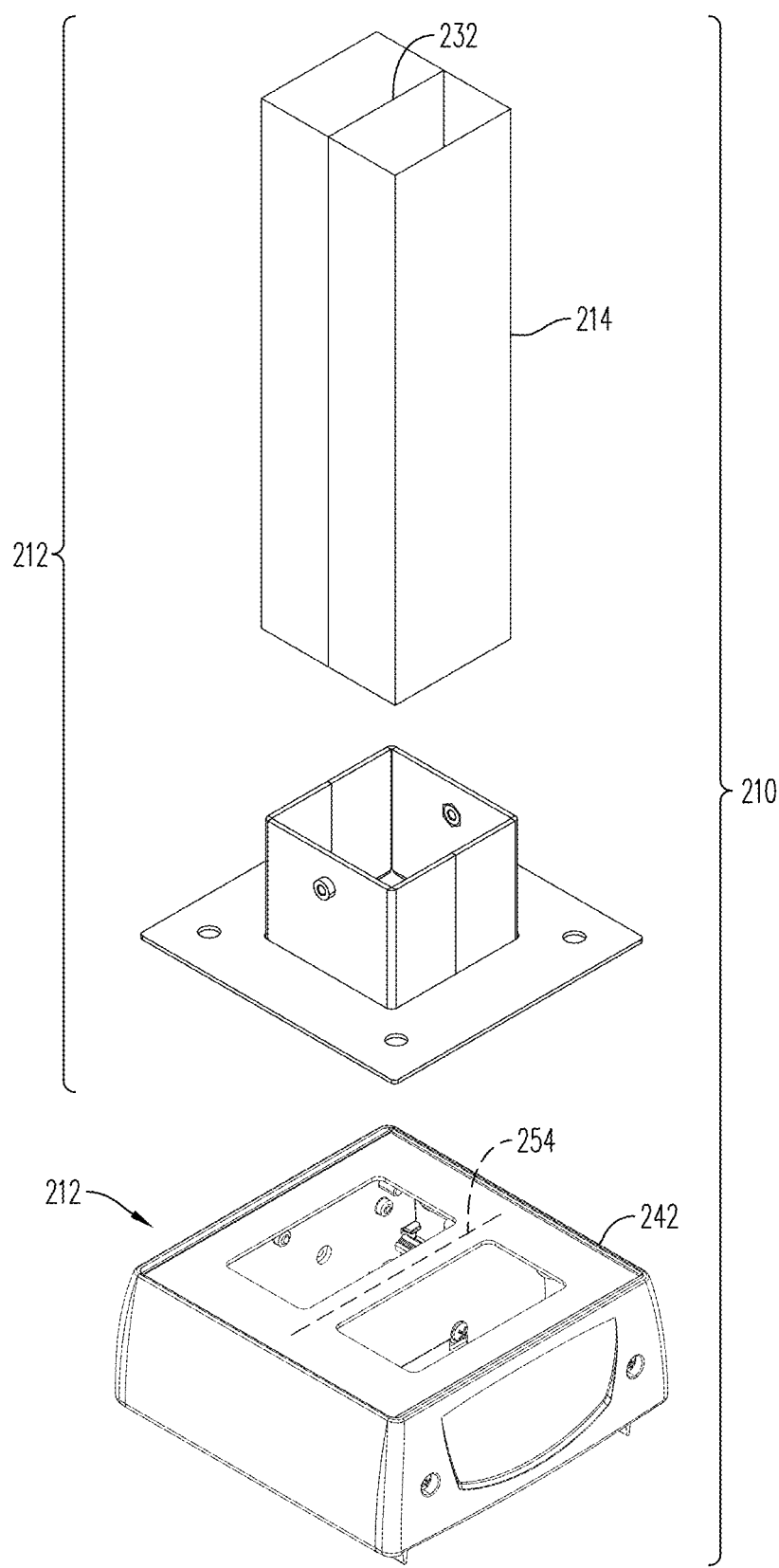
FIG. 13 is a perspective view of another exemplary embodiment of a service pole assembly according to the present disclosure.

Referring now to FIG. 13, an alternate embodiment of a fitting according to the present disclosure is shown and is referred to be reference numeral 212 with component parts performing similar or analogous functions also be labeled in multiples of one hundred.

Fitting 212 includes a top 240 and a base 242. Top 240 is configured for securement to base 240. Here, base 242 is shown as a device box that is commercially available from FSR Inc. under the tradename Smart-Way Raceway Device Box, which is compatible with source 16 discussed above.

Top 240 includes a pole foot 246 that is sized and configured to receive pole 214. For ease of discussion, pole 214 is commercially available from the Applicant, Hubbell Incorporated. Thus, fitting 212 is configured for use to form an assembly 210 with commercially available service poles 214, commercially available base 242, and the commercially available source 16 discussed above.

In the illustrated embodiment, pole 214 includes barrier 232 and base 242 includes wall 254. Pole 214 is inserted into fitting 212 so that barrier 232 and wall 254 are parallel—and preferably co-planar to—one another.

It should also be noted that the terms "first", "second", "third", "upper", "lower", and the like may be used herein to modify various elements. These modifiers do not imply a spatial, sequential, or hierarchical order to the modified elements unless specifically stated.

While the present disclosure has been described with reference to one or more exemplary embodiments, it will be understood by those skilled in the art that various changes may be made and equivalents may be substituted for elements thereof without departing from the scope of the present disclosure. In addition, many modifications may be made to adapt a particular situation or material to the teachings of the disclosure without departing from the scope thereof. Therefore, it is intended that the present disclosure not be limited to the particular embodiment(s) disclosed as the best mode contemplated, but that the disclosure will include all embodiments falling within the scope of the appended claims.

PARTS LIST service pole assembly 10
fitting
service pole 14
floor mounted source 16
power 18
neutral 18-1
common 18-2
communication 20
first section 22
second section 24
fasteners 26, 28
region 30
isolation barrier 32
conduits 34, 36
top 40
base 42
cover 44
pole foot 46
fasteners 48
structural braces 50
inner space 52
wall 54
regions 56, 58
openings 56-1, 56-2
central opening 58-1
upper end 60
lower end 62
structural braces 64
slots 66
fastener openings 68
fitting 112
top 140
base 142
opening 146-1
walls 154
regions 156, 158
step 156-1
notch 146-2
fastener openings 168
assembly 210
fitting 212
top 240
base 242
pole foot 246
barrier 232
wall 254

What is claimed is:

1. A service pole fitting, comprising:
a top having a cover with a pole foot extending from the cover, the foot pole and cover having an opening, the opening in the foot pole being configured to removably secure a service pole in the top; and
a base being secured to the cover to define an inner space, the base is configured to be removably secured to a floor mounted source.

2. The service pole fitting of claim 1, wherein the pole foot further comprises one or more fasteners configured to releasably secure the service pole.

3. The service pole fitting of claim 1, wherein the pole foot has a cross section selected from a group consisting of square, rectangular, round, and ovoid.

4. The service pole fitting of claim 1, wherein the base further comprises a wall that divides the inner space into two regions that are physically isolated from one other.

5. The service pole fitting of claim 4, wherein the two regions are open at an upper end of the base, one of the two regions has a pair of spaced apart openings at a lower end of the base, and the other of the two regions has a central opening at the lower end of the base.

6. The service pole fitting of claim 4, wherein the wall is positioned in the inner space so as to act as a stop for a pole.

7. The service pole fitting of claim 4, wherein the wall has a step that provides for a pathway for wiring from the floor mounted source through the cover.

8. The service pole fitting of claim 4, wherein the wall has a notch aligned with an opening in the cover.

9. The service pole fitting of claim 2, wherein the base further comprises one or more structural braces that are configured to mate with corresponding slots in the floor mounted source.

10. The service pole fitting of claim 4, wherein the base further comprises one or more fastener openings through which fasteners can extend to secure the base to the floor mounted source.

11. A service pole assembly, comprising:
a service pole having an isolation barrier dividing the service pole into two conduits that are physically isolated from one other;
a floor mounted source; and
a fitting configured to integrate the service pole to the floor mounted source, wherein the fitting comprises a top and a base, the base having a wall that divides the base into two regions that are physically isolated from one other from the floor mounted source to the top such that the two regions of the base communicate with the two conduits of the service pole.

12. The service pole assembly of claim 11, wherein the top comprises a pole foot sized and configured to receive the service pole.

13. The service pole assembly of claim 12, wherein the pole foot has a cross section selected from a group consisting of square, rectangular, round, and ovoid.

14. The service pole assembly of claim 11, wherein the floor mounted source is a raceway.

15. The service pole assembly of claim 11, wherein the service pole has a cross section selected from a group consisting of square, rectangular, round, and ovoid.

16. The service pole assembly of claim 11, wherein the isolation barrier and the wall are parallel to each other.

17. The service pole assembly of claim 11, wherein the isolation barrier and the wall are coplanar to each other.

18. A service pole fitting, comprising:
a base having an inner space, the base being configured to be removably secured to a floor mounted source; and
a top having a cover and a pole foot extending in a first direction from the cover and a structural brace extending in a second direction from the cover, the second direction being opposite from the first direction, the top having an opening passing through the cover and foot pole,
wherein the cover is secured on an upper surface of the base with the structural brace secured to the base in the inner space, and
wherein the opening in the pole foot is configured to removably secure a service pole in the top.

* * * * *